United States Patent [19]

Inoue et al.

[11] Patent Number: 4,752,786

[45] Date of Patent: Jun. 21, 1988

[54] SINGLE MOTOR MULTI-FUNCTION DRIVE CONTROL RECORDER

[75] Inventors: Ikutaro Inoue; Yutaka Usui, both of Takizawa; Hiroshi Izumi; Yuki Oishi, both of Tamayama, all of Japan

[73] Assignee: Alps Electric Co., Ltd., Japan

[21] Appl. No.: 911,234

[22] Filed: Sep. 24, 1986

[30] Foreign Application Priority Data

Sep. 28, 1985 [JP] Japan ................................ 60-213675

[51] Int. Cl.[4] ......................... G01D 15/24; B41J 19/58

[52] U.S. Cl. ............................ 346/139 R; 346/76 PH; 400/120; 400/185; 400/314; 400/323; 400/307.2; 400/547.3; 400/551; 400/577

[58] Field of Search ....................... 346/76 PH, 139 R; 400/120, 185, 212, 225, 290, 306.1, 307.2, 314, 523, 547.3, 551, 564, 577

[56] References Cited

U.S. PATENT DOCUMENTS 4,653,939 3/1987 Hibino ................................ 400/120

*Primary Examiner*—E. A. Goldberg
*Assistant Examiner*—Gerald E. Preston
*Attorney, Agent, or Firm*—Guy W. Shoup

[57] ABSTRACT

A thermal printer using a single pulse motor is disclosed. This thermal printer comprises: a single pulse motor; a moving member which is moved in accordance with the drive of the pulse motor; a head raising and lowering mechanism and a sheet feed mechanism which are selectively actuated in correspondence with the movement of the moving member; and a carriage moving mechanism which is interlockingly driven by the pulse motor. These components are driven by the single pulse motor. Also, the moving member may be a rack.

2 Claims, 2 Drawing Sheets

SINGLE MOTOR MULTI-FUNCTION DRIVE CONTROL RECORDER

BACKGROUND OF THE INVENTION

1. Field of the Invention

The present invention relates to a thermal printer in which the ink of an ink ribbon is melted and printed on a recording sheet by the heat of a thermal head.

2. Description of the Prior Art

This known type of thermal printer has heretofore been equipped with a head raising and lowering mechanism which is arranged in such a manner as to, for printing, move a thermal head downwardly (a head-down state) so as to press it against a platen and, while not engaged in printing, move the thermal head upwardly (a head-up state) so as to separate it from the platen, a carriage moving mechanism which moves along the platen a carriage having a ribbon cassette which accommodates the thermal head and an ink ribbon, a sheet feed mechanism which feeds in accordance with a printing operation a recording sheet disposed on the front side of the platen. The head raising and lowering mechanism, the carriage moving mechanism, and the sheet feed mechanism are respectively actuated by different drive sources such as pulse motors.

As described above, the prior-art thermal printer needs at least three pulse motors in order to drive the head raising and lowering mechanism, the carriage moving mechanism and the sheet feed mechanism. This means that the manufacturing cost is disadvantageously high since a multiplicity of drive sources are needed and each of the motors is expensive.

SUMMARY OF THE INVENTION

Object of the Invention

Accordingly, an object of the present invention is to provide a thermal printer which is capable of ensuring a head raising and lowering function, a carriage moving function, and a sheet feed function to the same degree of efficiency as in the prior art, and in which the number of drive sources for enabling these functions can be reduced.

Brief Summary of the Invention

To this end, the present invention comprises a single pulse motor which serves as a drive source, a moving member such as a rack which is driven and moved by the pulse motor, a head raising and lowering mechanism and a sheet feed mechanism which are selectively actuated in correspondence with the movement of the moving member, and a carriage moving mechanism which is in interlocking relationship with the drive of the pulse motor.

The present invention being constructed as described above, head raising and lowering and sheet feed operations can be performed by means of the movement of the moving member. In addition, the movement of the moving member and the driving of the carriage moving means are performed together by the pulse motor. Thus, the functions required of a thermal printer can be effected with a single pulse motor.

BRIEF DESCRIPTION OF THE DRAWINGS

Further objects, features and advantages of the present invention will become apparent from the following description of a preferred embodiment of the invention with reference to the accompanying drawings in which.

DESCRIPTION OF THE PREFERRED EMBODIMENT

The thermal printer in accordance with the present invention will be described below with reference to the accompanying drawings.

Figure 1:
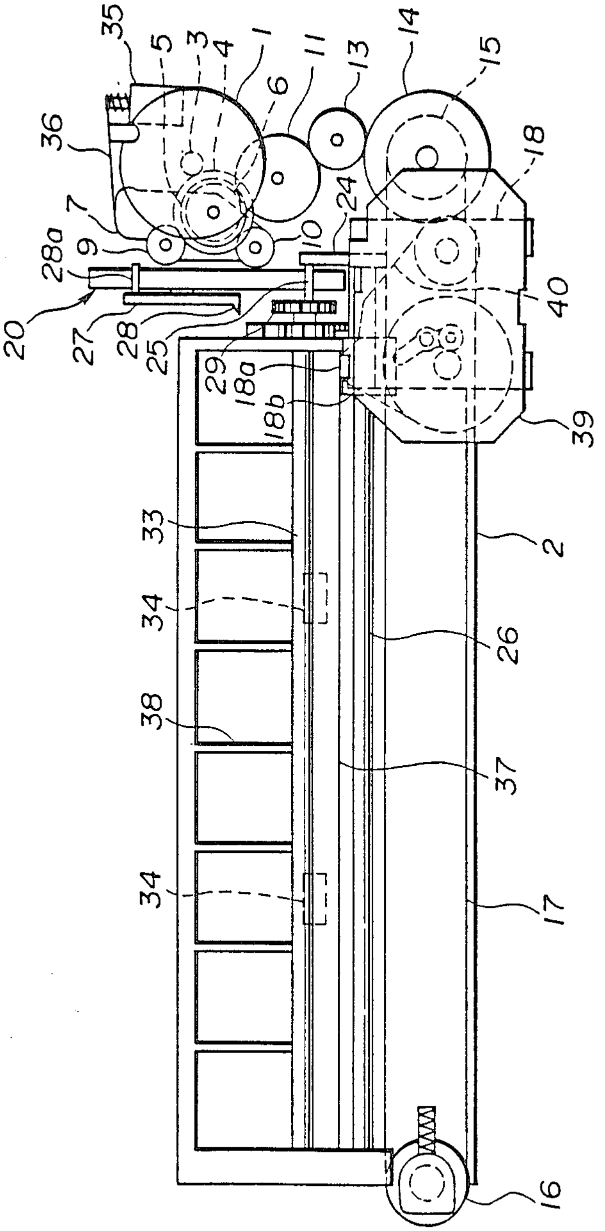
FIG. 1 is a plan view showing the schematic construction of one preferred embodiment of a thermal printer in accordance with the present invention.
Figure 2:
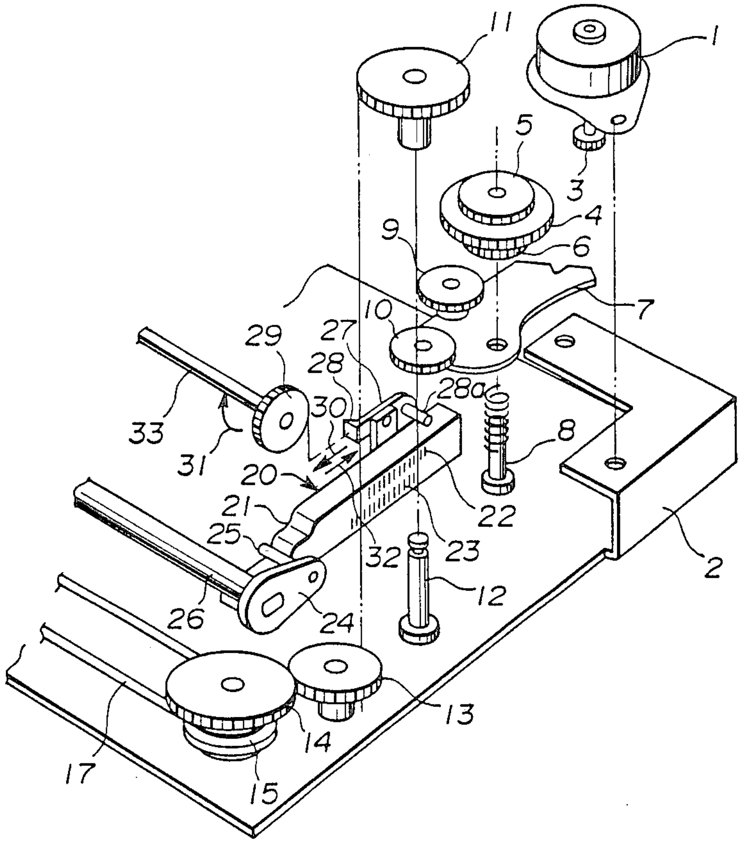
FIG. 2 is an exploded perspective view showing essential constituent parts which are incorporated into the embodiment shown in FIG. 1.

FIG. 1 is a plan view showing a schematic construction of one preferred embodiment of the thermal printer of the present invention and FIG. 2 is an exploded perspective view showing the essential constituent parts which are incorporated into the embodiment shown in FIG. 1.

In these Figures, reference numeral 1 denotes a drive source, namely, a pulse motor which is mounted on a chassis 2. Reference numeral 3 denotes a gear which is mounted on the output shaft of the pulse motor 1, reference numeral 4 denotes a gear which is engaged with the gear 3, and reference numerals 5, 6 denote gears which are integrally formed on the top and bottom of the gear 4. The integrally-formed gears 4, 5 and 6 are mounted on a swing plate 7 and are rotatably fitted onto a shaft 8 projecting from the chassis 8. The shaft 8 constitutes the swinging center 7 of the swing plate 7. Reference numerals 9, 10 denote gears which are rotatably supported on the swing plate 7 and are engaged with the gear 6. Reference numeral 11 denotes a gear which is engaged with a gear 5, and is rotatably fitted onto a shaft 12 projecting from the the chassis 2. Reference numeral 13 denotes a gear which is engaged with the gear 11 and is rotatably supported on the chassis 2.

Reference numeral 14 denotes a pulley gear which is engaged with the gear 13, while another pulley 15 is integral with the pulley gear 14. Reference numeral 16 shown in FIG. 1 denotes a pulley which is rotatably disposed on the side of the chassis 2 which is opposite to the pulley 15, and reference numeral 15 denotes a connecting element such as a belt which is passed around the pulley 15 and the pulley 16. Each end of the belt is attached to one side of the carriage 18. Reference numeral 18a shown in FIG. 1 denotes a thermal head which is mounted on the carriage 18, and reference numeral 18b denotes a rotatable support member for holding the thermal head 18a.

Reference numeral 20 denotes a moving member such as a rack which is capable of moving upwardly and downwardly as viewed in FIG. 1. As shown in FIG. 2, the front end of the the moving member 20 is formed with a cam 21, the upper portion of the side portion thereof has a toothed portion 22 which is engageable with the gear 9, and the lower portion of the same portion thereof has a toothed portion 23 which is engageble with the gear 10. Reference numeral 24 denotes a selector lever having at its end a pin 25 which is engaged with the upper surface of the rack 20 which includes the cam 21, and the selector lever 24 is integral with a main shaft 26 having an elliptical cross section. The main shaft 26 also serves as a guide shaft which guides the travel of the carriage 18. The support member 18b which holds the thermal head 18a is engageable with the main shaft 26, and the support member 18b is pivoted on the axis of the main shaft 26 concurrently with the rotation of the main shaft 26.

Reference numeral 27 denotes a lever which is pivotally mounted on the rack 20, and one end 28 of the lever 27 is engageable with a ratchet 29. For example, when the lever 27 travels in the direction of an arrow 30 shown in FIG. 2 concurrently with the travel of the rack 20, the end 28 is brought into engagement with the ratchet 29 and the ratchet 29 is turned in the direction of an arrow 31 shown in FIG. 2 in a pressed state. While the end 28 is in engagement with the ratchet 29, when the end 28 travels in the direction reverse to that of the arrow 32, the end 28 slides along the contour of the tooth of the ratchet 29 so as to prevent the rotation of the ratchet 29. Reference numeral 28*a* denotes a pin for appropriately limiting the pivotal motion of the lever 27, and the pin 28*a* is engageable with the top surface of the rack 20. Reference numeral 33 denotes a paper-feeding roller shaft onto which the ratchet 29 is fitted, and reference numeral 34 denotes a rubber roller which is disposed in face-to-face relationship with the paper-feeding roller shaft 33.

Reference numeral 35 shown in FIG. 1 denotes a trigger solenoid, reference numeral 36 denotes an actuator which is pivotally moved by the trigger solenoid 35 in such a manner as to be engaged with the swing plate 7 so as to limit improvement of the same. Reference numeral 37 shown in FIG. 1 denotes a platen over which a recording sheet (not shown) is laid, and reference numeral 38 denotes a paper guide for guiding the recording sheet (not shown) in such a manner that it may be smoothly inserted into the gap between the paper-feeding roller shaft 33 and the rubber roller 34. Reference numeral 39 shown in FIG. 1 denotes a ribbon cassette which is attached to the carriage 18, and reference numeral 40 denotes an ink ribbon which is accommodated by the ribbon cassette 39.

The selector lever 24 including the pin 25, the main shaft 26, the support member 18*b* and so forth constitutes a head raising and lowering mechanism which moves the thermal head 18*a* downwardly toward or upwardly away from the platen 37. The gears 11, 13, the pulley gear 14, the pullers 15, 16, the belt 17 and so forth constitute a carriage moving mechanism which moves the carriage 18 along the platen 37. Also, the lever 27, the ratchet 29, the paper-feeding roller shaft 33 and the rubber roller 34 constitute a paper feed mechanism for feeding a recording sheet into a printing position.

In the embodiment constructed as described above, the following basic operation is performed by driving the pulse motor 1.

[Head-up and Head-down]

The actuator 36 is turned by exciting the trigger solenoid 35, and the actuator 36 is released from the swing plate 7. In this released state, when the pulse motor is driven, the gear 3 is rotated, and the gears 4, 5, and 6 are simultaneously rotated together with the rotation of the gear 3. The gears 9, 10 are rotated concurrently with the rotation of the gear 4. At this time, for example, when the gear 4 is rotated in the clockwise direction as viewed in FIG. 1, the swing plate 7 is swung about the axis of the shaft 8 in the clockwise direction. This swing brings the gear 10 into engagement with the toothed portion 23 of the rack 20, so that the rack 20 is moved in the direction of the arrow 30 shown in FIG. 2. The pin 25 of the selector lever 24 is moved on top of the cam 21 by the movement of the rack 20, and the selector lever 24 is turned in the anticlockwise direction as viewed in FIG. 2. Simultaneously, the main shaft 26 is pivoted and the support member 18*b* shown in FIG. 1 is swung by the pivotal movement of the main shaft 26, so that the thermal head 18*a* is kept in a state separate from the platen 37. In this state, a recording sheet is fed, or the carriage 18 is moved in the direction of the home position (the position for commencing printing).

When the pulse motor 1 is driven such as to be rotated in the reverse direction, the swing plate 7 is swung in the anticlockwise direction as viewed in FIG. 1 by means of the gears 3, 4, whereby the gear 9 is engaged with the toothed portion 22 of the rack 20 and the rack 20 is moved in the direction of the arrow 32 shown in FIG. 2. Concurrently with the movement of the rack 20, the pin 25 of the selector lever 24 is moved downwardly along the cam 21, and the selector lever 24 is turned in the clockwise direction as viewed in FIG. 2. The thermal head 18*b* is swung toward the platen by means of the support member 18*b*, and finally, the thermal head 18*a* assumes a state of pressing the ink ribbon 40 of the ribbon cassette 39 against a recording paper (not shown), i.e., the head-down state. In this state, when the thermal head 18*a* is heated and the carriage is moved, a predetermined portion of the ink ribbon 40 is melted by the thermal head 18*a*, thereby performing printing on the recording sheet (not shown).

[Paper Feed]

In a state wherein the recording sheet (not shown) is inserted into the gap between the paper-feeding roller shaft 33 and the rubber roller 34 and is drawn out on the platen 37, when the rack 20 is moved in the direction of the arrow 30 shown in FIG. 2, the lever 27 is simultaneously moved in such a manner that the end 28 of the lever 27 is brought into engagement with the ratchet 29. This engagement causes the pivotal motion of the ratchet 29 in the direction of the arrow 31 shown in FIG. 2, so that the recording paper (not shown) clamped between the paper-feeding roller shaft 33 and the rubber roller 34 is fed by an amount corresponding to one line of printing.

When the pulse motor 1 is reversed and the rack 20 is concurrently moved in the direction of the arrow 32 shown in FIG. 2, the end 28 of the lever 27 slides over the teeth of the ratchet 29. The ratchet 29 is thereby prevented from being turned, so that the paper-feeding roller shaft 33 also stops turning, and sheet-feeding is thus suspended.

[Carriage Movement]

When the pulse motor 1 is driven, the gear 3 is rotated and the gears 4, 5, and 6 are rotated simultaneously. The gear 11 which is engaged with the gear 5 is rotated and the gear 13 engaged with the gear 11 is also rotated. The pulley 15 is rotated by the pulley gear 14 to cause the movement of the belt 17, and the carriage 18 is moved along the platen 37 concurrently with the movement of the belt 17. The ribbon cassette 39, the thermal head 18*a* and so forth are simultaneously moved together with the movement of the carriage 18.

In the embodiment constructed as described above, the carriage 18 can be moved by the drive force of the pulse motor 1, and the rack 20 is also moved by the drive force of the pulse motor 1, thereby enabling the upward and downward movements of the thermal head 18*a* and the feeding of a recording sheet. In other words, although a head raising and lowering function, a carriage-drive function, and a paper-feed function can be performed with the same degree of efficiency as is obtained with the prior-art thermal printer, only a single pulse motor is needed as the drive source, thereby enabling reduction in the manufacturing cost.

It is a matter of course that, while a sheet of paper is fed by an amount equivalent to one line of printing by the movement of the rack 20 in the above-described embodiment, the present invention is not limited to this. As an example, in the head-up state, if the pulse motor 1 is controlled in such a manner that the rack 20 is alternately moved in the directions of the arrows 30 and 32 shown in FIG. 2 in a repeated manner, any desired length of paper can be fed.

In addition, while the output shaft of the pulse motor 1, the shaft 8 constituting the rotating axis of the gears 4, 5, and 6, and the shaft 12 constituting the rotating axis of the gear 11 are all arranged to extend vertically with respect to the bottom of the chassis 2, the present invention is not limited to this arrangement. The output shaft and the shafts 8 and 12 may be disposed such as to extend horizontally.

Moverover, while the above-described embodiment refers to the belt 17 as being one example of a connecting element constituting a carriage moving means, the present invention is not limited to this. Instead of the belt 17, a wire or the like may be used.

As will be readily understood from the above description, since the thermal printer of the present invention is constructed as described above, a head raising and lowering function, a carriage-drive function and a paper-feed function can be effected with the same degree of efficiency as with the prior-art thermal printer, and in addition, only a single pulse motor is needed as the drive source, thereby enabling a reduction in the manufacturing cost.

What is claimed is:

1. A printer comprising:
   - a platen having a platen shaft and a platen gear thereon which is rotatable axially to drive the platen in rotation for feeding a recording sheet therearound;
   - a carriage movable reciprocally on a main shaft along the platen in parallel with the axis thereof;
   - a carriage moving mechanism connected to the carriage and including a carriage driving gear which is driven in forward and reverse rotational directions to move the carriage reciprocally in forward and reverse translational directions along the platen;
   - a printing head mounted on the carriage and movable therewith along the platen for printing on the recording sheet;
   - said main shaft having a lever fixed thereto which is pivotable axially in forward and reverse pivoting directions to pivot the main shaft, and said carriage being pivotable with the main shaft so as to move said printing head toward the platen for printing and away from the platen for non-printing, respectively;
   - a single pulse motor having an output shaft and an output gear thereon which is drivable in forward and reverse rotational directions for controlling the rotational movement of the platen, the translational movement of the carriage, and the pivoting movement of the printing head, wherein platen driving means is provided drivingly connected between said output gear of said motor and said platen gear, said carriage moving mechanism includes carriage driving means drivingly connected between said output gear and said carriage driving gear, and head driving means is drivingly connected between said output gear and said lever of said main shaft.

2. A printer according to claim 1, including a main gear in mesh with said output gear of said motor,
   - wherein said head driving means includes a swing plate swingably supporting a first swing gear and a second swing gear on opposing sides thereof both in mesh with the main gear, a rack which is engageable alternately by the first swing gear to be driven thereby in a forward linear direction and by the second swing gear to be driven in the reverse linear direction, and a cam on an end of the rack which engages the lever fixed to the main shaft for pivoting the lever in forward and reverse pivoting directions when the rack is driven in forward and reverse linear directions, respectively, whereby when said single motor is initially driven in a forward direction, the rack is driven in the forward linear direction by the first swing gear swung on the swing plate by rotation of the main gear into engagement with the rack, the cam on the end of the rack pivots the main shaft in the forward pivoting direction, and the print head is thereby pivoted toward the platen, and when the single motor is initially driven in the reverse direction, the rack is driven in the reverse linear direction by the second swing gear which is swung by opposite rotation of the main gear into engagement with the rack, the cam on the end of the rack pivots the main shaft in the reverse pivoting direction, and the print head is thereby pivoted away from the platen;
   - wherein said carriage moving mechanism includes a belt linked to the carriage and trained around a pulley which is rotatable together with the carriage driving gear, and the carriage driving gear being drivingly connected with the main gear so that the carriage is driven in the forward translational direction along the platen when said single motor is driven in the forward direction, and the carriage is driven in the reverse translational direction in a return movement when the single motor is driven in the reverse direction; and
   - wherein said platen driving means includes said platen gear being a one-way ratchet gear, said rack of the head driving means having a lever mounted thereon which is engageable with the ratchet gear to rotate it by a predetermined amount as the rack is driven in the forward linear direction, and said platen being thereby driven the predetermined amount to advance the recording sheet before the cam on the end of the rack pivots the print head toward the platen.

* * * * *